Feb. 22, 1966 J. FARMER 3,236,276
PROCESS AND APPARATUS FOR TREATING PINEAPPLES
Filed Feb. 16, 1961 4 Sheets-Sheet 1
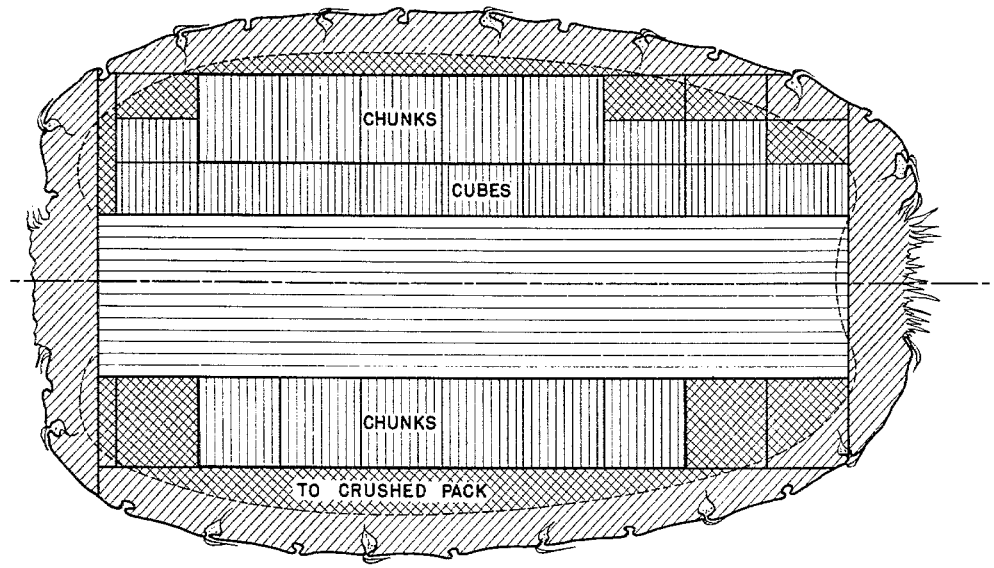
FIG. 1
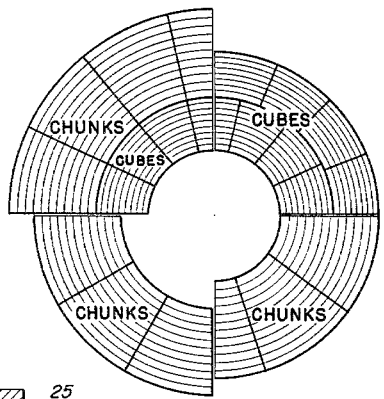
FIG. 2
FIG. 12
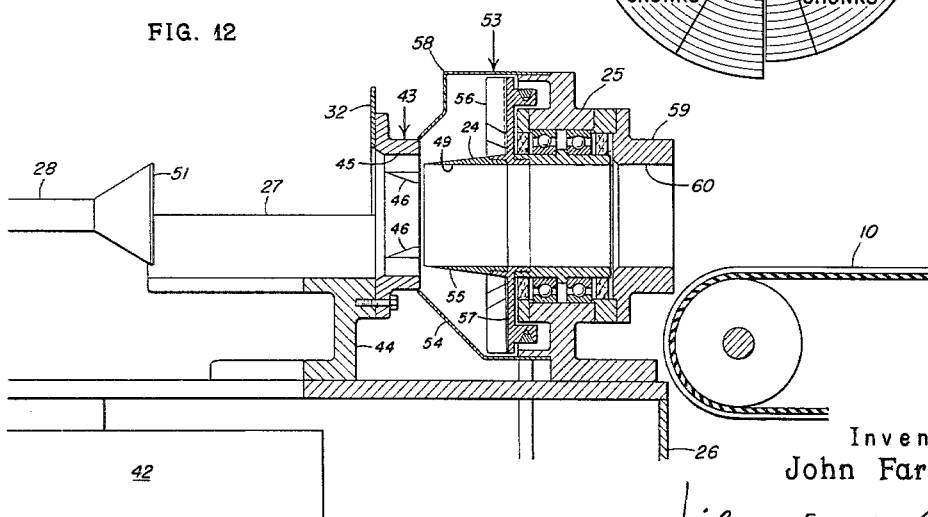
Inventor:
John Farmer
By Wilmer Mecklin
his Attorney

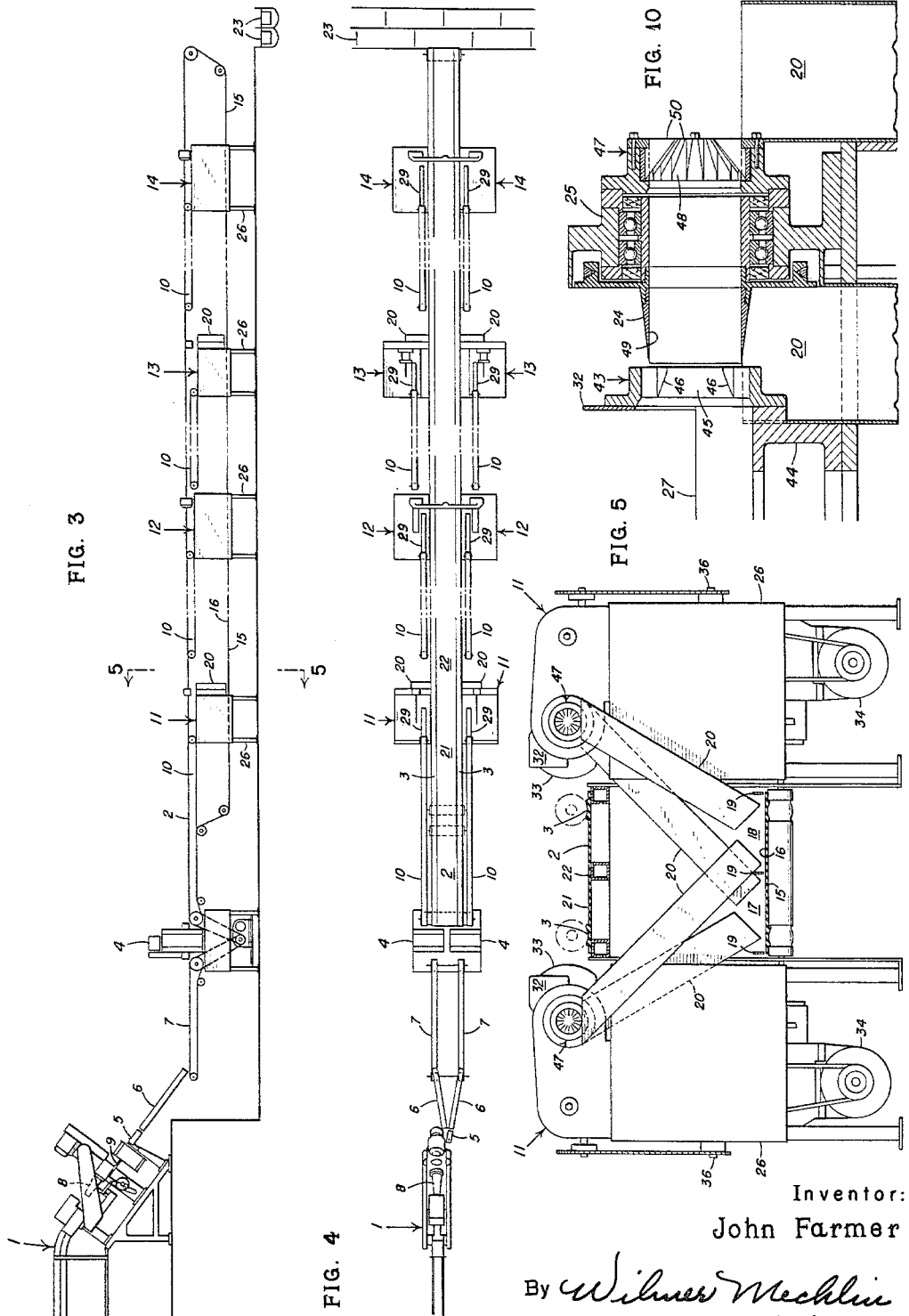

Inventor:
John Farmer
By Wilmer Mechlin
his Attorney

Feb. 22, 1966   J. FARMER   3,236,276
PROCESS AND APPARATUS FOR TREATING PINEAPPLES
Filed Feb. 16, 1961   4 Sheets-Sheet 4
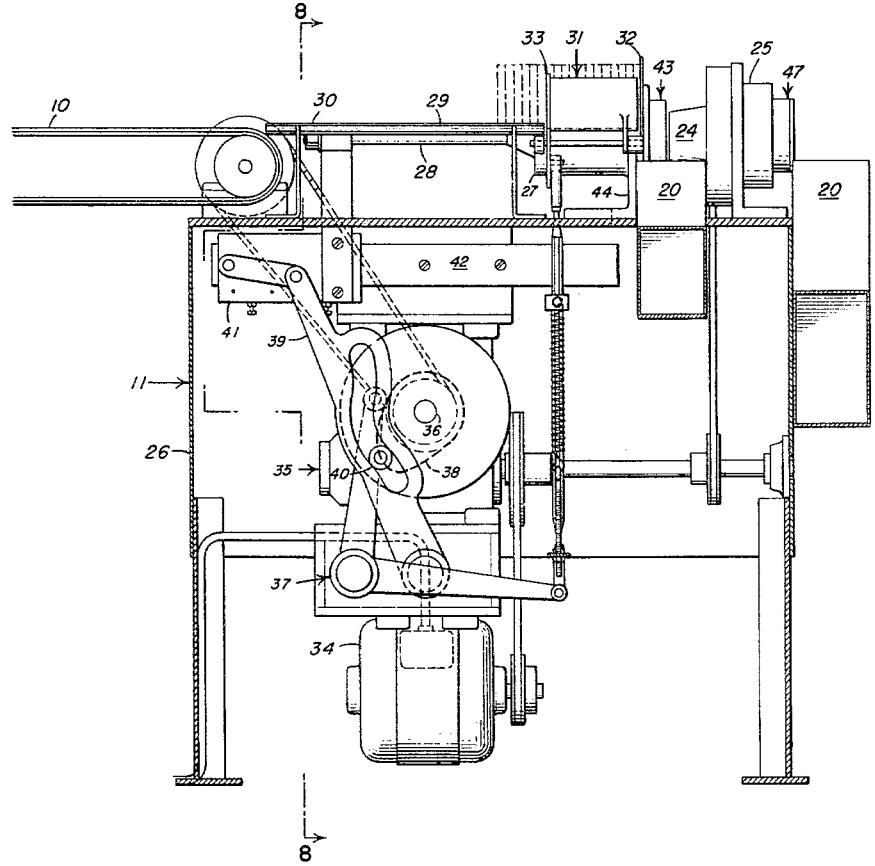
FIG. 9
FIG. 11
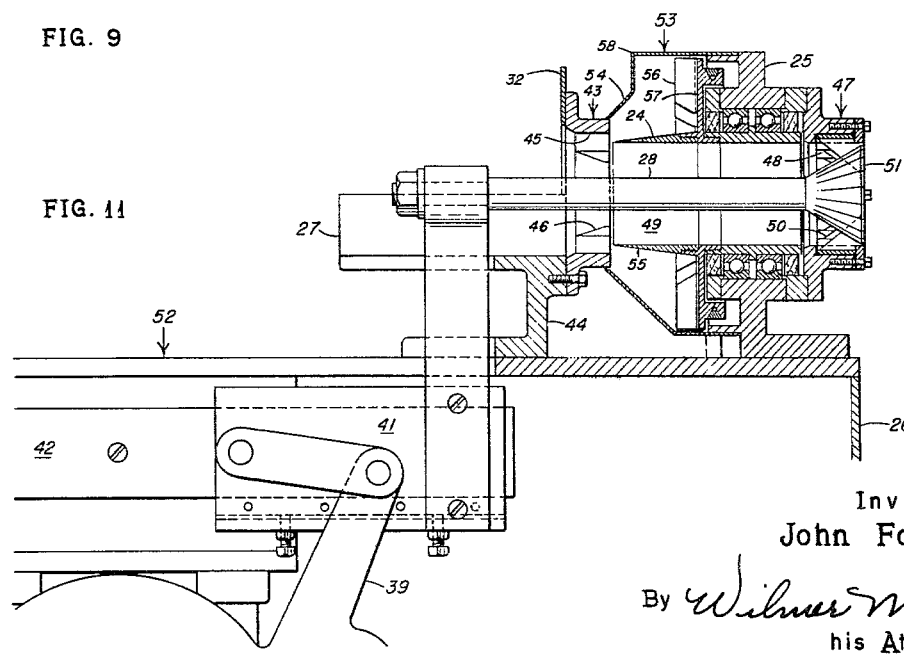
Inventor:
John Farmer
By Wilmer Mechlin
his Attorney

United States Patent Office 3,236,276
Patented Feb. 22, 1966

3,236,276
PROCESS AND APPARATUS FOR TREATING PINEAPPLES
John Farmer, Oahu, Hawaii, assignor to Honolulu Iron Works Company, Honolulu, Hawaii, a corporation of Hawaii
Filed Feb. 16, 1961, Ser. No. 89,826
9 Claims. (Cl. 146—238)

This invention relates to a process and apparatus for treating pineapples and has for its primary object the provision of an improved process and apparatus for cutting pineapples into segments. An object of the invention is to provide an improved process and apparatus for treating so-called large pineapples of over 5 3/16 inches O.D.

Another object of the invention is to provide an improved process and apparatus for treating large pineapples whereby, with less labor and equipment than required in conventional processing, a greater solid pack recovery is obtained.

An additional object of the invention is to provide a process for treating large pineapples whereby the increase over conventional processing in the solid pack recovery from such fruit ranges from about 45 to 75%.

A further object of the invention is to provide a process for treating pineapples wherein, by subjecting the pineapples to a plurality of sizings of selected diameters and cutting them into segments after the initial sizing, the bulk of the usable fruit in the pineapples is recovered in segment form for the solid pack.

Another object of the invention is to provide a process for treating pineapples wherein, after initial sizing and slicing, substantially all of the slices are subjected to one or more resizings and cut into segments, the diameters of the sizings being so related to those of different portions of the pineapples as, with the segmental cutting, to extract the bulk of the usuable fruit in a form suitable for the solid pack.

Still another object of the invention is to provide a process for treating pineapples, involving subjecting the pineapples to a plurality of sizings, wherein portions of the pineapples are resized and cut into segments in a single operation.

Another object of the invention is to provide a process for treating pineapples whereby the bulk of the edible fruit is recovered from large pineapples for the solid pack without trimming and the fruit loss and expense in labor and equipment attendant thereto.

A further object of the invention is to provide in apparatus for treating pineapples a machine capable of resizing pineapples and cutting them into segments in the course of the resizing.

An additional object of the invention is to provide a machine for resizing pineapples which, as part of the resizing operation, is adapted selectively to cut into segments either or both of the annuli into which a pineapple is divided by the resizing.

Other objects and advantages will appear hereinafter in the detailed description, be particularly pointed out in the appended claims and be illustrated in the accompanying drawings, in which:

FIGURE 1 is a diagrammatic longitudinal section of a typical large pineapple;

FIGURE 2 is a fragmentary diagrammatic vertical sectional view taken in part along lines 2a—2a and in part along lines 2b—2b of FIGURE 1;

FIGURE 3 is a somewhat schematic and fragmentary side elevational view of a preferred embodiment of the apparatus of the present invention;

FIGURE 4 is a plan view of the apparatus shown in FIGURE 3;

FIGURE 5 is a vertical sectional view on an enlarged scale taken along lines 5—5 of FIGURE 3;

FIGURE 9 is a vertical sectional view taken along lines 9—9 of FIGURE 8;

FIGURE 10 is a fragmentary vertical sectional view on an enlarged scale taken along lines 10—10 of FIGURE 8;

FIGURE 11 is a view corresponding to FIGURE 10 of another of the types of resizing machines used in the apparatus of FIGURES 3 and 4; and FIGURE 12 is a view corresponding to FIGURE 10 of a third type of resizing machine.

Figures 7, 8:
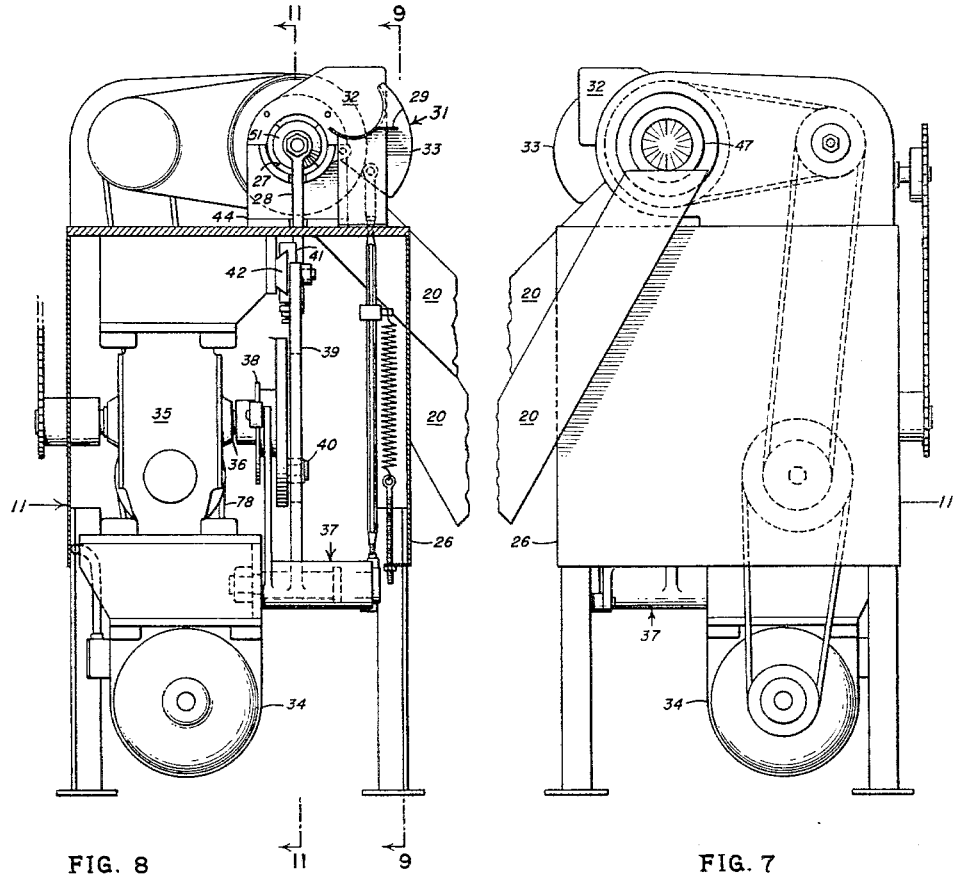
FIGURE 7 is an end elevational view of the machine of FIGURE 6.
FIGURE 8 is a vertical sectional view of the machine of FIGURE 6 taken along lines 8—8 of FIGURE 9.
Figure 6:
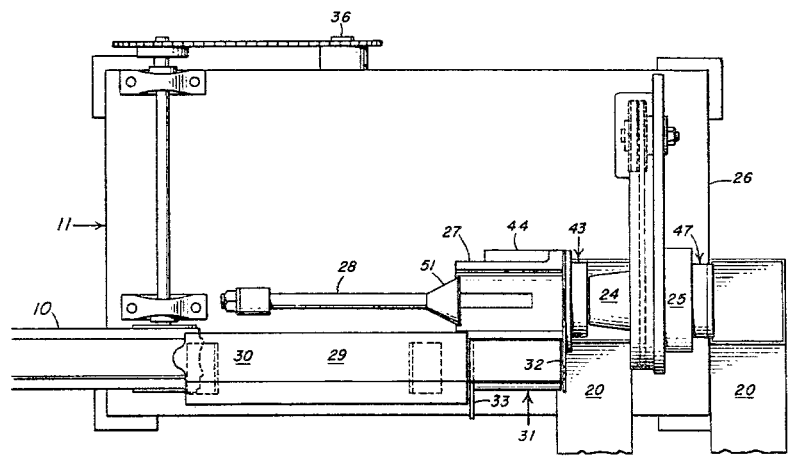
FIGURE 6 is a plan view on an enlarged scale of one of the preferred types of resizing machines used in the apparatus of FIGURES 3 and 4.

In the conventional process for canning pineapples, the pineapples on delivery to the cannery are sized, end cut and cored by a Ginaca machine, the cored fruit cylinders from that machine are sliced into slices of uniform thickness and, following inspection and sorting for quality, the slices are either canned as such or as tidbits or chunks into which they are cut before canning. As pointed out in my co-pending application Ser. No. 63,451 filed October 17, 1960, now Patent No. 3,036,920, issued May 29, 1962, the basic dissimilarity between the normal, ovoidal or egg-shape of a pineapple and the straight fruit cylinder cut from it in sizing renders it impossible to recover a very substantial part of the usable fruit for the solid pack by conventional processing and makes it necessary to relegate that part, instead, to the relatively inexpensive crushed and juice packs with consequent economic loss to the canning industry. This heretofore unsolved problem is solvable for middle range fruit which ranges between 4 3/8 in. and 5 3/16 in. O.D. by the process of that application in which selected slices, mainly from the end portions of the fruit, are resized after the initial sizing and slicing. The problem inherent in the basic dissimilarity in shape between the whole fruit and the cylinder cut from it is aggravated in the case of so-called large fruit of over 5 3/16 in O.D. by the industry practice of sizing such fruit to 3 3/4 in. O.D. to suit it for packing as slices in a No. 2 1/2 can, the largest standardized for slices, even though the fruit may actually be packed in some other solid form.

With the outside diameter of the fruit cylinder so limited relative to the maximum diameter of the usable fruit in the waist portions of the large pineapples, even the process of my co-pending application would fall short of recovering the bulk of the usable fruit for the solid pack unless it were expedient for the industry to adopt a larger standard slice size on the order of 4 1/4 in. O.D. The problem nonetheless is solvable for large fruit and without changing the industry's standards as to can sizes by processing the large pineapples for packing as chunks and cubes, in which forms they are readily packed into cans of standard size. Chunks and cubes are standard constituents of the pineapple solid pack and conventionally processed large fruit often is canned as chunks rather than as No. 2 1/2 size slices, but only at the expense of a decrease in the solid pack recovery. This is due to the need to increase the diameter of the core hole from the 1 5/16 in. of No. 2 1/2 slices to 1 15/16 in. in order to produce chunks of normal size. Thus, by conventional processing, large fruit will produce on the average about 49 cu. in. of slices but only about 41 cu. in. of chunks. On the contrary, when large fruit is processed for canning as chunks and cubes in accordance with this invention, the yield to the solid pack, rather than decreased, is increased phenomenally to an average of around 71.4 cu. in.

The derivation of the phenomenal increase in the solid pack recovery from large fruit is graphically depicted in FIGURES 1 and 2. The lower half of FIGURE 1 and the lower left quadrant of FIGURE 2 illustrate the recovery of chunks by the conventional process in which the large fruit is sized to 3¾ in., cored to 1¹⁵⁄₁₆ in., sliced into slices of .8312 in. thickness and each slice is cut radially into 12 segments of normal chunk size.

The upper half of FIGURE 1 and the other quadrants of FIGURE 2 show the comparative recovery of chunks and cubes by a process exemplary of that of this invention. In this exemplary process, the large fruit is initially sized to 4¼ in., cored to 1⅜ in. and sliced into slices of the .8312 in. thickness conventional for chunks. The clean slices from the wider intermediate or waist portions of the fruit are then resized or cylindrically cut axially to 2⁷⁄₁₆ in. to divide them into inner and outer annuli and these annuli are cut radially to their full depths preferably incident to or concurrent with the resizing. This, as shown in the upper left quadrant of FIGURE 2, produces 3½ chunks of normal size from the outer annuli and the same number of cubes from the inner for each quadrant of each slice versus the three chunks realized by the conventional process. In addition, the end slices, which have on or in their peripheral portions skin traces, eyes or other imperfections and for this reason are diverted in the conventional process to the crushed and juice packs, here are resized either once or twice, a single resizing of each slice to 3⅜ in. O.D. to cut off or remove the imperfect peripheral portions with preferably incident or concurrent radial cutting of the remaining clean or unblemished fruit yielding 2½ normal chunks per quadrant, as shown in the lower right quadrant. In the alternative illustrated by the upper right quadrant of FIGURE 2, the end slices are resized to the same 3⅜ in. O.D. but without radial cutting, so that the only effect of this resizing is to remove the imperfect peripheral portions. Thereafter, the resized slices are again resized, this time to a diameter of 2⁷⁄₁₆ in. with preferably incident or concurrent radial cutting of both the outer and the inner annuli with the result that there are obtained per quadrant some 7½ cubes.

Whether the recovery from the end slices of the average large fruit is in the form of the cubes of the upper right quadrant of FIGURE 2 or the chunks of the lower right quadrant, the solid pack recovery is the same, about 18.6 cu. in., while the combined chunk and cube recovery from the middle slices averages about 52.8 cu. in. The solid pack recovery from the average large fruit by the exemplary process thus totals some 71.4 cu. in. This, relative to the solid pack recovery obtainable by the conventional process when the large fruit are processed as chunks, is a phenomenal increase of 74.2% and a still phenomenal increase of 45.8% even when they are processed as No. 2½ size slices. Even most of the slices too heavily spotted to produce clean or unblemished fruit by resizing them to 3⅜ in. O.D. can be made to share in the solid pack recovery by resizing them to a suitable smaller outside diameter, such as 2⁷⁄₁₆ in., which, for slices having 1⅜ in. core holes, is sufficient to enable the resized slices to be cut into cubes. Thus, by resizing these heavily spotted slices to this smaller diameter and radially cutting the resized slices into cubes, only a very few of the slices cut from the fruit cylinders are lost as a whole to the solid pack.

Processed in the above manner, the usable, clean or unblemished fruit in the form of segments will be directed or transported for loading into cans and subsequent syruping and vacuum sealing in the manner usual in pineapple canneries. While all of the segments are readily loadable into cans of standard size and both the chunks and the cubes may be loaded as part of the strictly pineapple solid pack, the smaller segments or cubes particularly lend themselves to special or mixed fruit packs in which they are mixed with other tropical fruit or nuts such as banana, papaya, passion fruits, guava, lychee or coconut. Whatever may be the other ingredients of the can into which their segments are loaded, the process of this invention for the first time enables the bulk of the usable fruit within the skins of large pineapples to be recovered for the solid pack and in this accomplishment it enables both the labor and equipment required in the processing to be drastically reduced. This reduction stems largely from the nonessentiality to the present process of the trimming of the fruit cylinders prior to slicing pursuant to the time-honored practice of the industry. Designed to remove surface imperfections and not only demanding a substantial part of the total labor required in the processing but responsible for a considerable fruit loss due to excessive cutting and bruising in handling, trimming is here rendered unnecessary by the resizing of the salvage slices in which their imperfect peripheral portions are cut off.

Involving, in sequence, sizing, end cutting and coring, slicing, one or more resizings and radial cutting, the process of this invention can be conducted on apparatus or a processing line such as illustrated in FIGURES 3–5, which is capable of performing these operations automatically. The illustrated apparatus uses for the sizing, end cutting and coring either a conventional or an improved Ginaca machine or Ginaca 1, the improved machine disclosed in my co-pending application Ser. No. 29,508 filed on May 16, 1960, being preferred because of its greater efficiency and higher rate of output, on the order of about 150/min. in the case of large pineapples. The capacity of the balance of the processing line for efficient operation of course should match the output of the Ginaca and, depending on the Ginaca it uses, the line may have one or duplicate sets of processing equipment, the components of each set in the latter case being arranged in line at one side of the line with a counterpart of the other set at the opposite side. As in my co-pending application on Pineapple Treating Apparatus, Serial No. 82,240 filed on January 12, 1961, it is preferred not only to use the high speed Ginaca of application Serial No. 29,508 and duplicate sets of processing equipment but also to have, as the means for conveying the sliced fruit for inspection and sorting and processing of the slices, an endless belt 2 extending to the end of the line and having a plurality of transversely spaced grooves or concave tracks 3 formed integrally with or fixed to it and of a contour relative to the slices such as to support the latter upright or on edge and present them in that fashion for inspection and sorting. Also as in the above application filed on January 12, 1961, the duplication of the processing equipment at either side of the main belt or conveyor 2 will entail the provision of a pair of suitable slicers or slicing machines 4, one at each side of the line and discharging onto one of the spaced inspection tracks 3 and the division of the output of the Ginaca 1 between the two slicers by a suitable fruit divider 5 and associated chutes 6, such as described in that application, each of the chutes, as there, leading to a feed belt 7 of one of the slicers 4, during the progress of the cored fruit cylinders over which the initial inspection is made to discard any wholly rotten or otherwise unusable fruit.

Cut on the Ginaca 1 by a rotary tubular sizing knife 8 and reciprocating coring tube 9, each of which in its preferred form differs only in size from the sizing knife and coring tube of the improved machine shown in detail in my application Ser. No. 29,508, the cored fruit cylinders of the 4¼ in. O.D. and 1⅜ in. I.D. preferred in processing large fruit, are fed by the feed conveyors to the pair of slicers 4, each of which may be conventional but preferably is a slicing machine such as disclosed in my co-pending application Ser. No. 857,035, filed on December 3, 1959, now Patent No. 3,136,348. Cut or sliced by the slicing machines 4 into slices, preferably of the .8312 in. thickness standardized for chunks, the sliced fruit cylinders will be discharged by the slicers onto the inspection tracks 3 of the inspection belt 2.

As the slices are carried on edge down the processing line by the main conveyor 2, they are inspected and sorted according to quality and in normal sequence first the clean slices, then the lightly spotted slices and finally the remaining heavily spotted or salvage slices will be separated or removed from those in the inspection tracks 3 for resizing. If, as will usually be the case, the inspection and sorting is performed manually by operators stationed at inspection and sorting stations at opposite sides of the line, the slices, separated or sorted out according to quality at one of the stations provided therefor, may be transferred to one of a pair of sorting tracks (not shown) on the main belt 2, each paralleling and adjoining and outside of one of the inspection tracks. On the other hand, the separation may be accomplished by transferring the sorted slices from the inspection tracks directly to feed belts 10, each preferably formed, as is each track of the main belt, to receive and support a single row or line of slices on edge or upright and feed them endwise to the associated resizing machine. Each set of processing equipment is here provided with four resizing machines which, in the order in which they are positioned along the processing line beyond the slicing machines 4, are a first resizing machine 11 for resizing clean slices to a diameter preferably of 2 7/16 in., a second resizing machine 12 for resizing lightly spotted slices to a diameter of preferably 3 3/8 in. O.D., a third, 13, for subjecting the resized slices from the preceding machine to a further resizing to a diameter of 2 7/16 in., and a fourth, 14, for resizing heavily spotted fruit to an outside diameter of 2 7/16 in. Each of these resizing machines, except the second, 12, produces segments in the form of chunks or cubes or both and, to lead these segments away for loading, use is here made conveniently of the return flight 15 of the main conveyor 2. To enable the segments from the several resizing machines to be segregated or separated automatically into chunks and cubes, the inner or underside 16 of the main conveyor in its return flight conveniently is partitioned or divided transversely into separate chunk and cube sections 17 and 18 by fixed strips or partitions 19 running longitudinally of the conveyor and each resizing machine has a discharge chute 20 leading to one or each of these sections as appropriate. Conversely, by separating the inspection tracks 3, the outer or upper side 21 of the main conveyor 2 is provided with a preferably flat intermediate or mid-section 22 onto which the scraps or unusable portions of the slices cut off by one or another of the resizing machines may be discharged and which in turn conveniently may discharge or dump these scraps at the end of the processing line into one or more discharge conveyors 23 for transporting them elsewhere for processing for the crushed and juice packs.

Capable together of cutting a maximum volume of segments from large fruit, the preferred resizing machines 11, 12, 13 and 14, of which 11, 13 and 14 also may be termed segment-cutting machines, are identical except as to radial cutting, in the size of certain of their cylindrical cuts and in the manner in which their output is handled. With these exceptions, the detailed illustration in FIGURES 8-12 of one of the first or clean-slice resizing machines will thus suffice for all. As shown in those figures, each resizing machine has a rotary tubular sizing or, more properly, resizing knife 24 anti-friction mounted in a fixed bearing 25 on a stand or other suitable support 26, the knife, other than in the inside diameter of its bore 27 and in preferably having its rotative axis horizontal and parallel to the main conveyor 2, being similar to the usual sizing knife of a Ginaca machine. Each resizing machine also is fed slices by one of the feed conveyors 10, either directly from the main conveyor 2 or from a preceding machine in its set of processing equipment.

While the slices fed to the machines might be fed directly to their resizing knives 24, it is practically impossible to provide them with an uninterrupted feed, particularly if the slices are sorted by hand. Consequently, the preferred resizing machines are designed to resize slices in batches and for this purpose each machine has its resizing knife offset to one side of its feed belt 10 and pushes or forces slices in batches directly to and through the knife from a fixed guide trough 27 disposed in advance of and in axial alignment with the knife by a reciprocating pusher or plunger 28. For transferring slices in batches to its guide trough 27, each resizing machine has aligned with its feed belt 10 a supply trough 29 aligned with the feed belt and having at the rear end of a fixed entry section 30 a transfer section or cradle 31. Backed by a fixed stop plate 32 against which slices are forced by the pressure of the feed belt on succeeding slices and hinged to the stand 26 for swinging, pivoting or oscillating by a fixed horizontal axis, the transfer cradle 31 in normal position is in alignment with the fixed entry section 30 and at the opposite end of its swing is disposed to transfer or discharge slices into the guide trough 27. So that slices beyond its batch on the entry section 30 will not interfere with its oscillation, the transfer cradle 31 carries at its front end a sweep 33 which, when the two sections are out of alignment, temporarily blocks the rear end of the entry section.

The preferred resizing machines are designed to operate continuously during operation of the processing line with its resizing knife 24 rotating constantly and its feed belt 10 running continuously. To operate as intended, the oscillating transfer cradle 31 and the reciprocating pusher 28 of each machine have the same repetitive operating cycle, the cradle receiving slices during its dwell in normal position in alignment with the entry section 30 at a time when the pusher 28 is in its dwell in retracted position. Thereafter, with the pusher still in retracted position, the cradle swings over and transfers a batch of slices to the guide trough 27. As the cradle starts its swing back to normal position, the pusher begins its advance or power stroke during the course of which the cradle returns to normal position to receive more slices. The pusher continues its power stroke, in process pushing the slices into and the resized slices through the resizing knife 24 and at the end of that stroke retracts or returns to normal position. This cycle of operation of its cradle and pusher is obtained for each machine by suitable drive means. In the illustrated drive means, the machines have individual motors 34 mounted in their stands 26 for driving their resizing knives and associated conveyors and in each the same motor also drives the transfer cradle and the pusher. This is here accomplished by driving the cradle and pusher through reduction gearing 35 and a common crank and cam shaft 36, the cradle through a bell crank 37 linked to it and engaging a cam 38 on the shaft 36 and the pusher by a lever 39 pin-and-slot-connected to a carriage 41 of the cradle slidably mounted on a slide 42 fixed to the stand 26.

Possessing the above features in common with the other resizing machines, the first resizing machine 11 of each set not only resizes the clean slices by cutting each cylindrically into inner and outer annuli but in the course of the resizing cuts both annuli radially so that the machine discharges or puts out chunks from the outer annulus and cubes from the inner. To give the machine this capability, there is interposed between its guide trough 27 and resizing knife 24 an outer or front cutter head or collar 43 conveniently detachably mounted on the bracket 44 in which the guide trough is formed and having a central or axial bore 45 concentric with the knife and of the same diameter as the outside diameter of the slices to be resized. Fixed to the head 43 and instanding radially into its bore 45 to the depth of the outer annulus to be cut from each slice by the knife are a plurality of cutters or knives, the number of which is such, with their preferred uniform circumferential spacing, as to make radial cuts into the outer part of the slice of the depth and spacing of the usual chunks. Cutting the slices radially in advance to the depth of their outer annuli, as well as centering and holding the slices against turning as they are cut by the resizing knife 24 for increased preciseness of the resizing, the cutters 46 of the front cutter head or cutter 43 enable the resizing knife in cutting or severing the outer annuli to complete the production of chunks from those annuli.

The balance of each slice at this stage is the resized slice or inner annulus and this too is cut into segments, in its case, cubes, in the course of or incident to the resizing, the cutting of the resized slice or inner annulus is accomplished by a second rear or inner cutter head or collar 47 spaced by the resizing knife from the front cutter 43 and conveniently releasably attached to the rear end of the bearing 25 mounting the resizing knife 24. This rear cutter 47 has a cylindrical central or axial bore 48 concentric or coaxial with the resizing knife of the diameter of the throat 49 of the knife to fit the peripheries of the inner annuli. Entering the bore 48 as they leave the throat 49 of the resizing knife, the resized slices or inner annuli are therein cut into cubes by cutters or knives 50 fixed to the head 47 and instanding into the bore to the depth of the resized slices. Uniformly spaced and of a number to cut the resized slices into cubes of the desired size and received or sliding in corresponding radial slots in the head 51 of the pusher 28 so that the latter can pass through the bore 48 of the rear cutter head or cutter 47, the cutters 50 of that cutter finish the reduction of the initial slice into segments. To direct its output of segments onto the partitioned underside 16 of the main conveyor 2 or other suitable conveying means so that they can be carried away for loading into cans, this first or clean slice machine is provided with a pair of the chutes 20, one positioned to receive its output of chunks and the other its output of cubes.

After removal of the clean slices for treatment in the above manner, there will remain in each inspection track or tracks 3 on the main conveyor 2, of the three types or grades of visually different characteristics, clean, lightly spotted and heavily spotted, into which the slices from the slicing machines 4 are divided for the purposes of this invention, the lightly spotted and the heavily spotted slices. Of these two types or grades, the lightly spotted slices may be resized and cut into chunks in line with the illustration in the lower right quadrant of FIGURE 2 of that variation of the process. In such case, there will be substituted for the second and third resizing machines 13 and 14 of each set of the illustrated apparatus, an alternate resizing machine 52 having the common features of the other machines and otherwise as illustrated in FIGURE 11. The alternate resizing machine has a resizing knife 24 of a size to resize the lightly spotted slices to the preferred 3⅜ in. O.D. and a rear cutter 51 of corresponding bore to cut the resized slices into chunks. Since the peripheral portions of these slices will be imperfect and thus not suited for the solid pack, the front cutter 43 of the first machine may be dispensed with in this alternative second machine 52 but preferably will be retained for the benefit derived from its ability to center the slices on the sizing knife 24 and by its cutters 46 hold the slices against turning as they are being resized. However, a desirable departure from the first machine in this alternate second machine is the replacement of the chute 6 of the first for receiving chunks by a hooded blower 53, the hood 54 of which encloses the conventionally forwardly tapered front portion 55 of the resizing knife 24 and the paddles, fins or blades 56 of which are fixed through a backing plate 57 to the resizing knife for rotation therewith. With its spout 58 directed inwardly toward the main conveyor, this blower 53 is capable of blowing or projecting the scraps into which the imperfect peripheral portion of each slice is broken onto the mid-section 22 of the main conveyor for ultimate discharge therefrom into a discharge conveyor 22.

Rather than cutting the lightly spotted slices into chunks, it will ordinarily be preferred to cut them into cubes in the manner illustrated in the upper right quadrant of FIGURE 2 and it is for the production of the cubes that the second and third resizing machines 12 and 13 of each set are provided in the illustrated apparatus. The second resizing machine 12 is fed lightly spotted slices by its feed conveyor 7 directly from the main conveyor 2 but, unlike the first machine 11 used in resizing clean slices, is designed only to resize the slices to remove their imperfect peripheral portions. As illustrated in FIGURE 12, this second machine 12 therefore does not have a rear cutter 51 and may feed the slices resized to the preferred 3⅜ in. O.D. directly onto the feed conveyor or belt 7 of the third or succeeding machine 13. However, to adapt this second machine to be convertible into the alternative second machine 52 and so enable the apparatus at will to produce chunks from the lightly spotted slices, it is preferred to provide the second machine with a rear head, collar or extension 59 detachably connected to the bearing 25 mounting the resizing knife 24 and having a smooth or uninterrupted central or axial cylindrical bore 60 concentric with and of the same diameter as the throat 49 of the resizing knife. So provided and with the front portion of its resizing knife enclosed in one of the hooded blowers 53 to project the scraps from the peripheral portions of the slices onto the mid-section 22 of the main conveyor 2, this second machine 12 can readily be converted into the alternate second machine simply by interchanging its smooth-bored rear head 59 with a rear cutter 51 of the same inside diameter. The third machine of each set into which the second machine 12 feeds its resized slices is identical in all respects with the resizing machine 11 for the clean slices except that the inside diameter of its front cutter 43 is smaller to accommodate the resized slices, as opposed to the slices of the diameter of the initial sizing with which the first machine is fed, and that, since its output is entirely cubes, both of its chutes 6 lead to the cube section of the partitioned underside 16 of the main conveyor 2.

The fourth or last resizing machine 14 of each set of the illustrated apparatus is designed to be fed heavily spotted fruit by its feed conveyor or belt 7 directly from the main conveyor 2 and both to resize these slices to a sufficiently smaller outside diameter, preferably 2⁷⁄₁₆ in. to remove the imperfect peripheral portions and to cut the resized slices into cubes. It therefore has the same functions as the alternate second machine and, as illustrated in FIGURE 11, preferably is constructed in the same manner with a blower 53 to discharge the scraps, a rear cutter 51 for cutting the resized slices into cubes, and a chute for directing these cubes onto the underside 16 of the main conveyor and, as desired, may have a front cutter 43 for use in centering the slices on the resizing knife 24 and holding them against turning during resizing. Since it deals with heavily spotted rather than lightly spotted slices and the imperfect peripheral portion cut from each slice will be correspondingly deeper, both the resizing knife 24 and the rear cutter 51 of this fourth machine will have a smaller inside diameter than the alternate second machine, the preferred diameter for producing cubes of usual size being 2⁷⁄₁₆ in.

Whether the apparatus includes the four resizing machines of the illustrated embodiment or replaces the second and third by the alternate second machine, the process and apparatus of this invention can recover as segments for the solid pack the bulk of the usable fruit from large pineapples, a vast improvement over the recovery obtainable from such fruit by conventional processing and an improvement realized with a decrease rather than an increase in both the labor and the equipment required in the processing. It should be understood that the described and disclosed embodiments are merely exemplary of the invention and that all modifications are intended to be included that do not depart from the spirit of the invention and the scope of the claims.

I claim:

1. A process for treating pineapples to recover clean fruit therefrom comprising sizing, end cutting and coring a pineapple into a cored fruit cylinder, slicing said cylinder into slices, sorting said slices into clean, lightly spotted and heavily spotted slices, resizing said clean slices into inner and outer annuli, radially cutting said annuli into segments, and separately resizing said lightly spotted and heavily spotted slices and cutting the resized slices radially into segments.

2. A process for treating pineapples to recover clean fruit therefrom comprising sizing, end cutting and coring a pineapple into a cored fruit cylinder, slicing said cylinder into slices, sorting said slices into clean, lightly spotted and heavily spotted slices, resizing said clean slices into inner and outer annuli, radially cutting said annuli into segments, resizing said lightly spotted slices, resizing the resized slices from said lightly spotted slices into inner and outer annuli, cutting said last-named annuli radially into segments, and resizing said heavily spotted slices and radially cutting the resized slices therefrom into segments.

3. A process for treating pineapples to recover clean fruit therefrom comprising sizing a pineapple to substantially the maximum diameter of the fruit in the waist portion thereof, end cutting and coring said sized pineapple into a cored fruit cylinder, slicing said cylinder into slices, sorting said slices into clean, lightly spotted and heavily spotted slices, resizing said clean slices into inner and outer annuli, radially cutting said annuli into segments, and separately resizing said lightly spotted and heavily spotted slices and cutting the resized slices therefrom radially into segments.

4. Apparatus for treating pineapples for recovering clean fruit therefrom comprising means for resizing, end cutting and coring a pineapple into a cored fruit cylinder, means for slicing said cylinder into slices, and means effective in the course of sorting of said slices into clean, lightly spotted and heavily spotted slices for cutting the clean fruit thereof into segments, said last-named means including means for resizing the clean fruit into inner and outer annuli and radially cutting each of said annuli, and means for separately resizing and radially cutting the lightly and heavily spotted slices.

5. Apparatus for treating pineapples for recovering clean fruit therefrom comprising means for resizing, end cutting and coring a pineapple into a cored fruit cylinder, means for slicing said cylinder into slices, and means effective in the course of sorting of said slices into clean, lightly spotted and heavily spotted slices for cutting the clean fruit thereof into segments, said last-named means including means for resizing the clean fruit into inner and outer annuli and radially cutting each of said annuli, means for resizing the lightly spotted slices, means for resizing and radially cutting the resized slices from said lightly spotted slices, and means for resizing and radially cutting the heavily spotted slices.

6. A machine for cutting pineapples into segments to recover clean fruit therefrom comprising a rotary sizing knife, a pair of fixed cutters spaced by and having bores concentric with said knife, and a plurality of knives attached to and extending radially into the bore of each of said cutters.

7. A machine for cutting pineapple slices into segments to recover clean fruit therefrom comprising a rotary resizing knife and a pair of fixed front and rear cutters at front and rear ends of and having bores concentric with a throat of said knife, said bores of said front and rear cutters, respectively, having substantially the same diameter as the initial outside diameter of said slices and the diameter of said throat, and a plurality of knives fixed to each of said cutters and projecting radially into and uniformly spaced about the bore thereof.

8. A machine for cutting pineapple slices into segments to recover clean fruit therefrom comprising a resizing knife rotatably mounted on a support, front and rear cutters detachably fixed to said support at corresponding ends of and having cylindrical bores concentric with a cylindrical throat of said knife, said bores of said front and rear cutters being of substantially the same diameters, respectively, as the initial outside diameter of said slices and the diameter of said throat, and a plurality of fixed knives carried by each of said cutters and projecting radially into and uniformly spaced about the bore thereof, each of said knives being of a projection within its bore to cut radially to substantially the depth thereof one of the annuli into which each slice is divided by said resizing knife.

9. A machine for cutting pineapple slices into segments to recover clean fruit therefrom comprising a resizing knife rotatably mounted on a support, front and rear cutters detachably fixed to said support at corresponding ends of and having cylindrical bores concentric with a cylindrical throat of said knife, said bores of said front and rear cutters being of substantially the same diameters, respectively, as the initial outside diameter of said slices and the diameter of said throat, a plurality of fixed knives carried by each of said cutters and projecting radially into and uniformly spaced about the bore thereof, each of said knives being of a projection within its bore to cut radially to substantially the depth thereof one of the annuli into which each slice is divided by said resizing knife, and means for presenting said slices in batches for cutting into segments by said several knives.

References Cited by the Examiner

UNITED STATES PATENTS

| | | | |
|---|---|---|---|
| 1,556,053 | 10/1925 | Warren et al. | 146—6 |
| 1,671,723 | 5/1928 | Jagenburg | 146—6 |
| 2,023,810 | 12/1935 | Horner | 146—238 |
| 2,175,170 | 10/1939 | Hjelte | 146—6 |
| 2,195,193 | 3/1940 | Stanley | 146—6 |
| 2,247,810 | 7/1941 | Healy | 146—6 |
| 2,255,048 | 9/1941 | Ewald | 146—241 |
| 2,652,871 | 9/1953 | Botley et al. | 146—6 |

ROBERT C. RIORDON, *Primary Examiner.*

CHARLES W. ROBINSON, JOHN C. CHRISTIE,
*Examiners.*